No. 858,489. PATENTED JULY 2, 1907.
F. P. VAUGHAN.
WHEEL.
APPLICATION FILED MAR. 5, 1906.
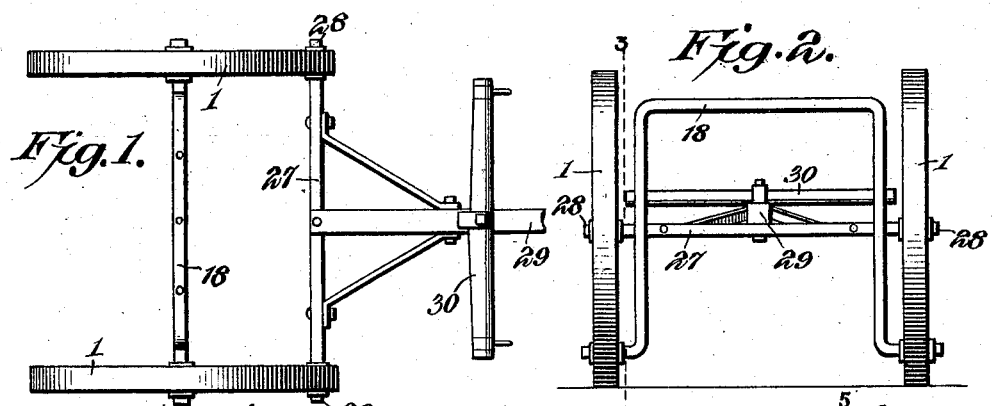
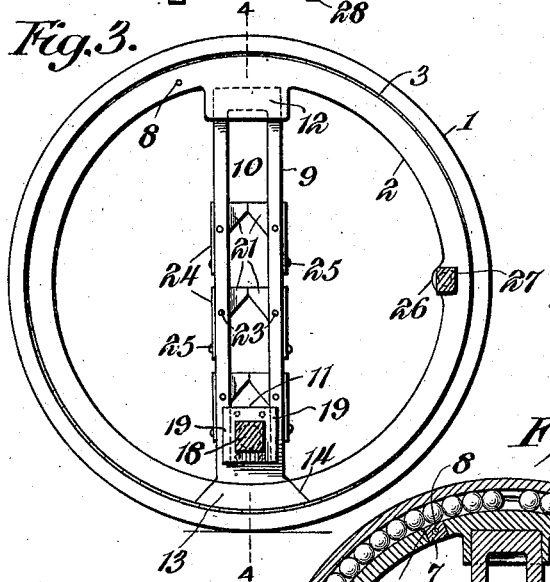
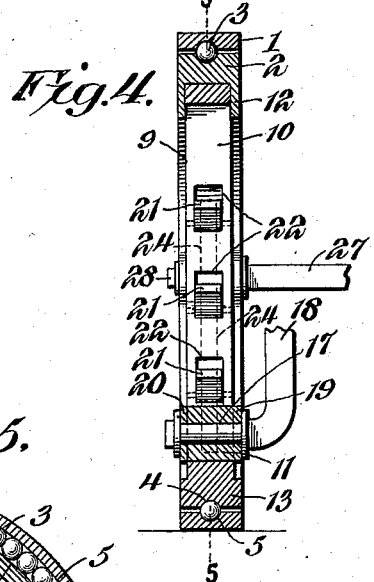
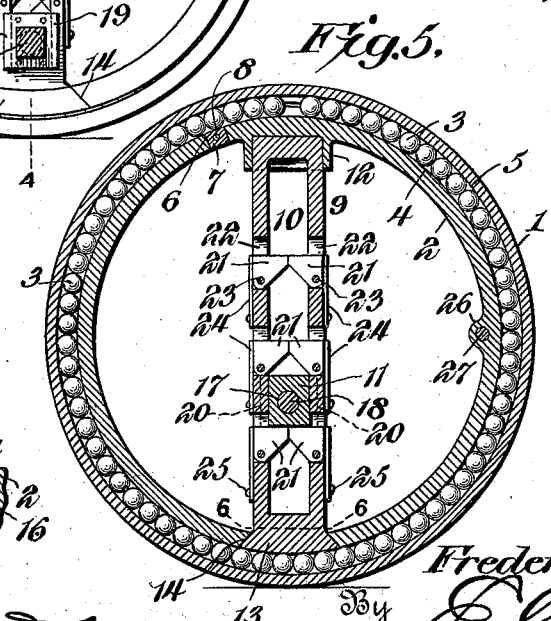
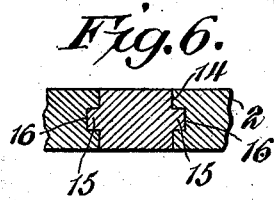
Inventor,
Frederick P. Vaughan,

UNITED STATES PATENT OFFICE.

FREDERICK P. VAUGHAN, OF CHICAGO, ILLINOIS.

WHEEL.

No. 858,489.  Specification of Letters Patent.  Patented July 2, 1907.

Application filed March 5, 1906. Serial No. 304,385.

*To all whom it may concern:*

Be it known that I, FREDERICK P. VAUGHAN, a citizen of the United States, residing at Chicago, in the county of Cook and State of Illinois, have invented certain new and useful Improvements in Wheels, of which the following is a specification.

The invention relates to improvements in wheels.

The object of the present invention is to improve the construction of wheels, and to so position the load and to so arrange the application of the draft of the wheel, that the weight of the load may be utilized to aid the rotation of the wheel in traveling over an obstruction or in ascending an acclivity.

A further object of the invention is to provide a wheel adapted to rotate on level ground with perfect freedom, and capable, when it meets an obstruction, of operating as a lever of the first class to lift the load, whereby when the load is lifted and advanced sufficiently, it will cause the wheel to roll over an obstruction.

Another object of the invention is to provide a wheel of this character having vertically adjustable load-receiving means, adapted to enable the running-gear of a vehicle, or other load-carrying construction, to be arranged at the desired elevation.

With these and other objects in view, the invention consists in the construction and novel combination and arrangement of parts, hereinafter fully described, illustrated in the accompanying drawing and pointed out in the claims, hereto appended; it being understood that various changes in the form, proportion, size, and minor details of construction, within the scope of the claims, may be resorted to without departing from the spirit or sacrificing any of the advantages of the invention.

In the drawing:—Figure 1 is a plan view of a portion of a running-gear provided with wheels constructed in accordance with this invention. Fig. 2 is a rear elevation of the same. Fig. 3 is a vertical sectional view, taken substantially on the line 3—3 of Fig. 2. Fig. 4 is a vertical sectional view, taken substantially on the line 4—4 of Fig. 3. Fig. 5 is a vertical sectional view on the line 5—5 of Fig. 4. Fig. 6 is a detail sectional view on the line 6—6 of Fig. 5.

Like numerals of reference designate corresponding parts in all the figures of the drawing.

1 designates the rim or outer section of the wheel, which is designed for use on various kinds of vehicles, traction engines, machines, and the like, and the said rim 1, which, in the accompanying drawing, also forms the tread of the wheel, may be constructed of any suitable material, and may be in a variety of forms to provide a wheel of the desired character. Within the rim is arranged an inner member 2, which is capable of rotary movement independently of the outer section or rim, anti-friction devices 3 being interposed between the outer section and the inner member to permit the two parts to have relative frictionless movement on each other. Various forms of anti-friction devices may be employed without affecting the character of the result. In the accompanying drawing, anti-friction balls are shown, suitable grooves 4 and 5 being provided in the inner face of the rim of the wheel and the outer face of the inner member, to form a race for the balls. The balls are preferably introduced into the race through an opening 6, in which is secured a plug 7, by a transverse fastening device 8.

The inner member 2, which is shown in the form of an open annulus or ring to provide an open wheel, may, of course, be varied in form without affecting the relative independent rotary movement between the inner member and the outer rim. The inner circular section or member 2 carries a support 9, which, in the present instance, is in the form of a vertical standard, having a vertical longitudinal opening 10, to permit a load-receiving block or member 11 to be adjusted vertically. The upper end of the support 9 is fitted in a socket 12 of the inner circular section or member 2, and the lower end 13 of the support is preferably in the form of an upwardly tapered foot, which is interlocked with the inner section or member 2 at the bottom thereof, and which is adapted to rest directly upon the anti-friction devices, and subject the lower portion of the outer section or rim directly to the weight of the load. The bottom of the inner section or member is provided with a tapering recess 14, to receive the upwardly tapered foot 13 of the support 9, and the said foot 13 is provided at its front and rear faces with projecting tongues 15, which are arranged in corresponding grooves 16 of the front and rear walls of the recess 14. By this construction the foot of the support is interlocked against vertical and lateral movement. The inclination of the walls of the tapered recess 14 prevent any vertical displacement of the foot, and the tongues hold the foot against horizontal movement. This construction, however, enables the weight of the load to be transmitted directly to the outer section or rim of the wheel without being distributed throughout the inner section or member 2. The socket 12 depends from the top of the inner section or member 2, and conforms to the configuration of the standard or support. The support, however, can be of various forms to provide a wheel of the desired character and appearance.

The vertically adjustable load-receiving block or member 11 is provided with a central opening 17, for the reception of one end of an axle 18. The axle 18, in the accompanying drawing, is shown arched, but this is not necessary, as the vertical adjustment of the block or member 11 will enable a straight axle to be arranged either close to the ground or at a sufficient elevation to clear ordinary obstructions. The block or member is provided at the inner and outer faces of the support with projecting flanges 19 and 20 for retaining the block or member 11 in the opening of the support. The inner flanges are integral with the block or member 11, and the outer flanges are formed by a detachable plate, suitably secured to the outer end of the block or member 11.

The support is provided at intervals with means for holding the block or member 11 at different elevations, and these means preferably consist of dogs 21, arranged in pairs and secured in slots 22 of the side portions of the support, by pivots 23. The pivots 23 are arranged at the lower ends of the dogs, which are tapered to form inwardly projecting portions that abut, as clearly shown in Figs. 3 and 5 of the drawing. The lower edges of the inner portions of the dogs are inclined or beveled, and when the block or member 11 is moved upwardly, the dogs swing outwardly. The dogs are automatically swung inwardly beneath the block or member 11 by springs 24. The springs 24, which are secured at their lower ends to the support by rivets 25, or other suitable fastening devices, have free upper ends for engaging the outer edges of the dogs. The draft is applied to the inner section or member of the wheel in advance of the center, or rather, the vertical diameter of the wheel, a sufficient distance so that the point of application of the draft will lie in advance of a stone or other obstruction met by the wheel, whereby the wheel will form a lever of the first class for lifting the load. The stone or obstruction constitutes the fulcrum of the lever, and when the load is raised and advanced sufficiently, it will cause the wheel to roll forward over the obstruction. In this manner the weight of the load may be caused to assist the rotation of the wheel, and this may be effected by throwing the weight in advance of the vertical diameter of the wheel. Should the foot of the support be thrown forward in advance of its central position at the bottom of the wheel, it will be apparent that the weight of the load will operate to assist the forward rotation of the wheel. This change in the position of the parts of the wheel may be temporarily, or otherwise effected, and will be found of advantage in drawing the wheel over an obstruction. The particular manner of mounting the support will admit of the application of the weight of the load to the lower portion of the outer section or rim, in advance of the vertical diameter of the wheel.

Ordinarily the draft will be applied to the front of the inner section or member, which is provided with an inwardly projecting ear or eye 26, and having an opening for the reception of a transverse draft-bar or member 27. The draft-bar or member 27 extends across the running-gear and connects the front wheels, as clearly shown in Figs. 1 and 2 of the drawing, and its terminals may be threaded for the reception of nuts 28. A tongue 29 is centrally connected to the transverse bar or member 27, and is adapted to support a doubletree 30 in the usual manner. However, the draft may be applied to the front wheels in various other ways to suit the character of the vehicle, machine, or other device to which the wheels are applied.

Having thus fully described my invention, what I claim as new and desire to secure by Letters Patent, is:—

1. A wheel of the class described comprising an outer rotary section or rim, and an inner section or member mounted for independent rotary movement and carrying means for supporting a load, said wheel being provided with means mounted wholly on it for connecting the draft to the wheel in advance of the load-carrying means.

2. A wheel of the class described comprising an outer rotary rim or section, an inner section or member mounted for independent rotary movement, means carried by the inner member in its rotary movement for supporting a load, and means mounted wholly on the wheel for applying the draft to the wheel in advance of the load-supporting means.

3. A wheel of the class described comprising an outer rotary rim or section, an inner section or member mounted for independent rotary movement, anti-friction devices interposed between the outer section or rim and the inner section or member, means carried by the inner member in its rotary movement for supporting a load, and means for applying the draft to the wheel in advance of the load-supporting means.

4. A wheel of the class described comprising an outer rotary rim or section, an inner support mounted for independent rotary movement, and carrying means for supporting a load, and means mounted wholly on the wheel for applying the draft to the wheel in advance of the load-carrying means.

5. A wheel of the class described comprising an outer rotary rim or section, and an inner support mounted for independent rotary movement and provided with adjustable load-receiving means adapted to permit a load to be arranged at different elevations.

6. A wheel of the class described comprising an outer rotary rim or section, and an inner support mounted for independent rotary movement and provided with vertically adjustable means for receiving a load, and means for connecting the draft to the wheel in advance of the load carrying means.

7. A wheel of the class described comprising an outer rotary section or rim, an inner support mounted for independent rotary movement, a load-receiving element mounted on the support for vertical adjustment, and means carried by the support and arranged at intervals for securing the said element in its adjustment.

8. A wheel of the class described comprising an outer rotary section or member, an inner support mounted for independent rotary movement and provided with an opening, a block slidable in the opening, and dogs carried by the inner member for securing the block in its adjustment.

9. A wheel of the class described comprising an outer rotary section or member, an inner support mounted for independent rotary movement and provided with an opening, a block slidable in the opening, and spring-actuated dogs arranged in pairs and located at opposite sides of the said opening for supporting the block in its adjustment.

10. A wheel of the class described comprising an outer rotary section or member, an inner vertical support mounted for independent rotary movement and provided with a longitudinal opening, spring-actuated dogs pivotally mounted at opposite sides of the opening and having lower beveled or inclined edges, and a block adjustable in the opening of the support and arranged to engage the inclined edges of the dogs for swinging the same outwardly, said dogs being disposed in pairs and arranged to abut for supporting the block in its adjustment.

11. A wheel of the class described comprising an outer rotary rim or section, an inner member mounted for independent rotary movement, and a support carried by the inner member in the movement thereof to shift the position of the load and having an independent movement, whereby the weight is applied to the outer section or rim.

12. A wheel of the class described comprising an outer rotary section or rim, an inner member mounted for independent rotary movement, and a support carried by the inner member in such rotary movement and interlocked with the lower portion thereof and having an independent downward movement.

13. A wheel of the class described comprising an outer rotary section or rim, an inner member mounted for independent rotary movement and provided at the bottom with an opening, and a support fitted in the opening and having an independent downward movement for applying the weight directly to the outer rim or section.

14. A wheel of the class described comprising an outer rotary section or rim, an inner member mounted for independent rotary movement and provided at the bottom with a tapered opening and having a recess, and a support having a tapered foot fitted in the opening and provided with a tongue for engaging the recess.

15. A wheel of the class described comprising an outer rotary rim or section, an inner member mounted for independent movement, a support carried by the inner member and having adjustable load-receiving means, said support having a downward movement independent of the inner member to apply the weight of the load directly to the outer section or rim, and means for applying the draft to the wheel in advance of the load-carrying means.

In testimony whereof I affix my signature in presence of two witnesses.

FREDERICK P. VAUGHAN.

Witnesses:
JOHN H. SIGGERS,
H. F. RILEY.